(12) United States Patent
Keller, III et al.

(10) Patent No.: US 11,450,625 B2
(45) Date of Patent: Sep. 20, 2022

(54) SYSTEM AND METHOD FOR PHYSICALLY DETECTING COUNTERFEIT ELECTRONICS

(71) Applicant: NOKOMIS, INC., Canonsburg, PA (US)

(72) Inventors: Walter J. Keller, III, Bridgeville, PA (US); Stephen Dorn Freeman, Ellicott City, MD (US); Jason Galyardt, Pittsburgh, PA (US)

(73) Assignee: NOKOMIS, INC., Canonsburg, PA (US)

( * ) Notice: Subject to any disclaimer, the term of this patent is extended or adjusted under 35 U.S.C. 154(b) by 0 days.

(21) Appl. No.: 16/669,816

(22) Filed: Oct. 31, 2019

(65) Prior Publication Data

US 2020/0144204 A1 May 7, 2020

Related U.S. Application Data

(62) Division of application No. 13/410,797, filed on Mar. 2, 2012, now Pat. No. 10,475,754.

(Continued)

(51) Int. Cl.
*H01L 23/00* (2006.01)
*G06F 21/73* (2013.01)
*G01R 31/28* (2006.01)

(52) U.S. Cl.
CPC ........ *H01L 23/576* (2013.01); *G01R 31/2837* (2013.01); *G06F 21/73* (2013.01);
(Continued)

(58) Field of Classification Search
CPC ........... H01L 23/576; H01L 2223/6677; H01L 2924/19105; H01L 2924/14;
(Continued)

(56) References Cited

U.S. PATENT DOCUMENTS

| 5,218,294 A | 6/1993 | Soiferman |
| 5,227,800 A | 7/1993 | Huguenin et al. |

(Continued)

FOREIGN PATENT DOCUMENTS

| JP | 06011530 | 1/1994 |
| JP | 07106920 | 4/1995 |

(Continued)

OTHER PUBLICATIONS

Y.P Zhang, Duixian Liu, Antenna-On-Chip and Antenna-In-Package Solutions To Highly Integrated Milimeter-Wave Devices for Wireless Communications, 2009. vol. 57 No. 10.

(Continued)

*Primary Examiner* — Manuel A Rivera Vargas
*Assistant Examiner* — Yaritza H Perez Bermudez
(74) *Attorney, Agent, or Firm* — AP Patents; Alexander Pokot

(57) ABSTRACT

A system for inspecting or screening electrically powered device includes a signal generator inputting a preselected signal into the electrically powered device. There is also an antenna array positioned at a pre-determined distance above the electrically powered device. Apparatus collects RF energy emitted by the electrically powered device in response to input of said preselected signal. The signature of the collected RF energy is compared with an RF energy signature of a genuine part. The comparison determines one of a genuine or counterfeit condition of the electrically powered device.

24 Claims, 4 Drawing Sheets

Related U.S. Application Data

(60) Provisional application No. 61/574,250, filed on Jul. 29, 2011, provisional application No. 61/464,262, filed on Mar. 2, 2011.

(52) U.S. Cl.
CPC .. *G01R 31/2839* (2013.01); *H01L 2223/6677* (2013.01); *H01L 2924/0002* (2013.01); *H01L 2924/14* (2013.01); *H01L 2924/19105* (2013.01)

(58) Field of Classification Search
CPC ............. H01L 2924/0002; G06F 21/73; G01R 31/2837; G01R 31/2839
See application file for complete search history.

(56) References Cited

U.S. PATENT DOCUMENTS

| | | | |
|---|---|---|---|
| 5,254,953 A * | 10/1993 | Crook | G01R 31/71 324/538 |
| 5,302,830 A | 4/1994 | Shivanandan | |
| 5,424,633 A | 6/1995 | Soiferman | |
| 5,517,110 A | 5/1996 | Soiferman | |
| 5,668,342 A | 9/1997 | Discher | |
| 5,714,888 A | 2/1998 | Naujoks | |
| 5,764,087 A * | 6/1998 | Clark | G06F 1/0335 327/105 |
| 6,049,301 A | 4/2000 | Weagant | |
| 6,057,765 A | 5/2000 | Jones et al. | |
| 6,163,259 A | 12/2000 | Barsumian et al. | |
| 6,496,703 B1 | 12/2002 | da Silva | |
| 6,720,905 B2 | 3/2004 | Levitan et al. | |
| 6,759,863 B2 | 7/2004 | Moore | |
| 6,765,527 B2 | 7/2004 | Jablonski et al. | |
| 6,825,456 B2 | 11/2004 | Chadwick et al. | |
| 6,897,777 B2 | 5/2005 | Holmes et al. | |
| 6,927,579 B2 | 8/2005 | Blades | |
| 6,985,771 B2 | 1/2006 | Fischell et al. | |
| 7,015,809 B1 * | 3/2006 | Sayers | H04W 40/06 340/539.1 |
| 7,130,624 B1 | 10/2006 | Jackson et al. | |
| 7,138,936 B2 | 11/2006 | Duff et al. | |
| 7,188,037 B2 | 3/2007 | Hidehira | |
| 7,391,356 B2 | 6/2008 | Brumley et al. | |
| 7,512,511 B1 | 3/2009 | Schultz et al. | |
| 7,515,094 B2 | 4/2009 | Keller, III | |
| 7,609,199 B2 | 10/2009 | Nishijima et al. | |
| 7,639,178 B1 | 12/2009 | Mulbrook et al. | |
| 7,777,671 B2 | 8/2010 | Schnitzer et al. | |
| 7,777,672 B2 | 8/2010 | Schnitzer et al. | |
| 7,844,341 B2 | 11/2010 | Von Arx et al. | |
| 8,063,813 B1 | 11/2011 | Keller | |
| 9,059,189 B2 | 6/2015 | Keller et al. | |
| 9,887,721 B2 | 2/2018 | Keller et al. | |
| 2002/0160768 A1 * | 10/2002 | Gventer | H04M 1/24 455/423 |
| 2004/0204109 A1 * | 10/2004 | Hoppenstein | H01Q 21/0025 455/562.1 |
| 2005/0099173 A1 * | 5/2005 | Siade | G01R 31/2868 324/757.05 |
| 2005/0265124 A1 | 12/2005 | Smith | |
| 2006/0152232 A1 | 7/2006 | Shvets et al. | |
| 2007/0027643 A1 | 2/2007 | Lesesky et al. | |
| 2007/0229270 A1 | 10/2007 | Rofougaran | |
| 2007/0234058 A1 | 10/2007 | White | |
| 2007/0279071 A1 | 12/2007 | Orton | |
| 2008/0103555 A1 | 5/2008 | Dicks et al. | |
| 2008/0265919 A1 * | 10/2008 | Izadian | G01R 1/06744 324/755.01 |
| 2008/0284609 A1 | 11/2008 | Rofougaran | |
| 2009/0099830 A1 * | 4/2009 | Gross | G01R 31/2813 703/14 |
| 2009/0218657 A1 | 9/2009 | Rofougaran | |
| 2010/0033386 A1 | 2/2010 | Lewis et al. | |
| 2010/0073229 A1 * | 3/2010 | Pattabiraman | G01S 19/46 342/357.64 |
| 2010/0117906 A1 * | 5/2010 | Miller | G01S 13/825 342/387 |
| 2010/0123453 A1 | 5/2010 | Pauly et al. | |
| 2010/0125438 A1 | 5/2010 | Audet | |
| 2010/0230597 A1 | 9/2010 | Kumhyr et al. | |
| 2010/0237854 A1 | 9/2010 | Kumhyr et al. | |
| 2010/0241864 A1 | 9/2010 | Kelley et al. | |
| 2010/0332199 A1 | 12/2010 | Dhanekula et al. | |
| 2011/0320170 A1 | 12/2011 | Pathal et al. | |
| 2012/0179812 A1 | 7/2012 | Keller, III | |
| 2012/0226463 A1 | 9/2012 | Keller, III et al. | |
| 2015/0137830 A1 * | 5/2015 | Keller, III | G06F 21/73 324/629 |
| 2015/0168486 A1 * | 6/2015 | Isaac | G01R 31/2834 324/756.02 |

FOREIGN PATENT DOCUMENTS

| | | |
|---|---|---|
| JP | H09502804 | 3/1997 |
| JP | 2000076387 | 3/2000 |
| JP | 2003503679 | 1/2003 |
| JP | 2003294842 | 10/2003 |
| JP | 2004245709 | 9/2004 |
| JP | 2004526970 | 9/2004 |
| JP | 2006300753 | 11/2006 |
| JP | 2007510932 | 4/2007 |
| JP | 2009515172 | 5/2007 |
| JP | 2008082798 | 4/2008 |
| JP | 2009094280 | 4/2009 |
| JP | 2009277136 | 11/2009 |
| JP | 200915475 | 8/2010 |
| JP | 2010177062 | 8/2010 |
| JP | 2010283102 | 12/2010 |
| JP | 2010287860 | 12/2010 |
| JP | 2011074709 | 9/2011 |
| JP | 2011171956 | 9/2011 |
| JP | 2011174130 | 9/2011 |
| JP | 2011199251 | 10/2011 |
| JP | 2011258693 | 12/2011 |
| JP | 2012026913 | 2/2012 |
| JP | 2013169836 | 9/2013 |
| KR | 100946238 | 3/2010 |
| KR | 101077441 | 10/2011 |
| WO | 00950008125 | 3/1995 |
| WO | 02082448 | 10/2002 |
| WO | 2006118184 | 12/2006 |
| WO | 2007056226 | 5/2007 |
| WO | 20070056226 | 5/2007 |
| WO | 2009047585 | 4/2009 |
| WO | 2012014623 | 2/2012 |

OTHER PUBLICATIONS

William E Cobb, et al. Intrinsic Physical-Layer Authentication of Integrated Circuits, LEEE Transactions On Information Forensics and Security, vol. 7, No. 1 Feb. 2012.

Ashwin Lakshminarimhan, Electromagnetic Side-Channel Analysis for Hardware and Software Watermarking, Master of Science in Electrical and Computer Engineering, Sep. 2011.

* cited by examiner

SYSTEM AND METHOD FOR PHYSICALLY DETECTING COUNTERFEIT ELECTRONICS

CROSS REFERENCE TO RELATED APPLICATION

This patent application is related to and claims priority from U.S. Provisional Patent Application Ser. No. 61/464,262 filed Mar. 2, 2011 and U.S. Provisional Patent Application Ser. No. 61/574,250 filed Jul. 29, 2011 respectively and being incorporated into this document by reference thereto. This application is further closely related to U.S. Ser. No. 13/410,909 entitled "INTEGRATED CIRCUIT WITH ELECTROMAGNETIC ENERGY ANOMALY DETECTION AND PROCESSING", now issued as U.S. Pat. No. 9,059,189 B2 on Jun. 16, 2015. This application is being assigned to the assignee of the present invention and the disclosure of this application is hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

FIELD OF THE INVENTION

The present invention relates, in general, to a system and method for detecting counterfeit electronic devices using the intended or unintended emissions given off by the devices.

BACKGROUND OF THE INVENTION

According to a recent 2010 study by the US Department of Commerce, Bureau of Industry and Security the number of counterfeit incidents reported grew from 3,868 in 2005 to 9,356 in 2008. Respondents to the survey cited the two most common types of counterfeit components were blatant fakes and unscreened functional product. This survey had 387 respondents representing all facets of the electronic component supply chain. All facets of the supply chain reported instances of counterfeit product. The World Semiconductor Trade Statistics estimates the global TAM for semiconductors will be in excess of $200 billion, thus the 387 respondents provide quantitative results for only a small portion of the total market. As the electronics has grown so has the sophistication of counterfeiters. Many counterfeits are now impossible to detect via visible detection and the best counterfeits even pass detailed electrical tests, but may do not meet other specific requirements instilled on the genuine parts that the counterfeits do not possess. When installed in fully functional product the counterfeits often malfunction, fail due to environmental conditions, age prematurely and in some cases just don't function at all despite a close electrical match.

Prior to the conception and design of the instant invention, efforts have been made to inspect and screen counterfeits. However, all of them are either superficial or extremely expensive. Of superficial techniques, the simplest is visual inspection, but as counterfeits have become increasing sophisticated these techniques have become less reliable. In contrast, reliable techniques that are in existence are expensive or are destructive in nature.

The different types of inspection techniques under which counterfeit components can be discovered include: visual external inspection for signs of resurfacing, visual microscopic inspection of encapsulant finish and Lead surfaces, and x-ray inspection. During x-ray inspection the internal structure of like date and lot codes of electronic components are examined and certain types of counterfeit parts can be discovered. The less sophisticated counterfeit devices exhibit vast differences in internal structure including, but not limited to, different Die Frames and Different Wire Bonding. X-ray fluorescence spectroscopy can also be used to confirm RoHS status which is often overlooked by counterfeiters. Decapsulation, which involves the removing of the external packaging on a semiconductor and exposing the semiconductor wafer or die for microscopic inspection of brand marks, trademarks, laser die etchings, date codes and other defining characteristics can be used to determine some counterfeits. Chemical etching techniques which use acid to expose a wafer or die packaged in plastics or resins can likewise expose the internal components for inspection, but are destructive in nature.

Mechanical techniques including sanding, cutting, cracking, or chipping the ceramic or metal to expose wafer or die for inspection are also used successfully, but again result destruction of the part being inspected. Scanning Acoustic Microscopy can be used to discover evidence of resurfacing and blacktopping by revealing laser etching below blacktop material. Internal part layout tracing and external packaging curve tracing are other options to determine if the product has the anticipated electrical characteristics.

Electrical tests range from full electrical tests, which are typically expensive, to gross leak and fine lead functional electrical testing.

Counterfeit electronic can be found in many forms. One major feature linking most counterfeits is that the internal electronics function differently, even in some cases if only very slightly so, than a genuine part straight off the manufacturing line. If the internal parts of the electronics whether it be a discrete semiconductor, integrated circuit, printed circuit board, circuit board assembly or product are functioning differently the part will give off a different electromagnetic signature.

The electromagnetic signature given off is a fundamental property of any electronic device. At the most basic level accelerating electronics give off electromagnetic energy creating an electromagnetic signature. Since the application of power and oscillating inputs will by definition accelerate electrons within the device being screened for counterfeits and therefore give off electromagnetic energy a fundamental characteristic of the screening and inspection enhancements practiced by this invention will apply to all modern electronics. The power described can be external commercial power, battery power or internal power generation mechanisms. The oscillator input can be any source that generates a frequency based oscillation. Some may be monotonic such as for example, but clearly not limited to a crystal oscillator or ceramic resonator. Others may be very complex timing control signals or communication signals. In essence, there is a vast number of is a signals in modern electronics that provide oscillation between a high and a low state to coordinate, control, communicate with, synchronize, reference and provide an myriad of other actions on and of circuits. This oscillation is a significant source of energy that by the laws of physics in one manner of another via radiative and conductive means is emitted external to the electronics or electrical device. Therefore, there is a need for a system and method to inspect and screen counterfeit electronics in a non-destructive manner utilizing the RF energy emitted by such electronics.

SUMMARY OF THE INVENTION

The present invention provides an apparatus and method for screening and inspecting electronics for counterfeit electrical and electronic based components, boards, devices, systems. This invention includes a sensitive electromagnetic energy collection apparatus, a means for comparing the collected energy to a known standard or to a predetermined understanding of expected emissions of the inspected object and an algorithm for automatically determining if the collected energy matches the standard.

The sensitive electromagnetic energy collection apparatus could be any means known in the art for collecting electromagnetic energy.

In one embodiment, the invention uses a highly sensitive Radio Frequency (RF) energy collection apparatus and a signature comparison means for comparing the collected energy to a known standard and where RF is defined as covering the frequency range from 3 KHz to 300 GHZ.

Typical embodiments focus on the RF frequency range described though the same techniques can clearly apply to higher frequency or shorter wavelength emissions such as infrared spectrum analysis.

In one embodiment, the highly sensitive RF energy collection apparatus is a traditional RF receiver.

In another embodiment the ultra-sensitive RF energy collecting device is a photon detector that operates in the RF energy spectrum.

In another embodiment, the electronic device being inspected has at least power connected to it and may also have one or more oscillatory signals connected to one or more inputs of the inspected electronics.

In another embodiment an active free-field RF illumination source is used to enhance the emissions given off by the targeted device for simultaneous collection by the RF collection means for the purpose of detecting counterfeits.

OBJECTS OF THE INVENTION

It is, therefore, one of the primary devices of the present invention to provide a system that uses electromagnetic energy in the RF spectrum to detect counterfeit electrical and electronic devices.

Another object of the present invention is to provide a system for detecting counterfeit electrical and electronic devices that includes a precision input source generating a precision input for injection into such electrical and electronic devices.

A further object of the present invention is to provide a system for detecting counterfeit electrical and electronic devices that includes an antenna array with integrated low noise amplifier.

Another object of the present invention is to provide a system for detecting counterfeit electrical and electronic devices that includes means for comparing signature of emitted RF energy with baseline RF characteristics.

Yet another object of the present invention is to provide system for detecting counterfeit electrical and electronic devices that includes test devices preconfigured for screening individual circuit component.

Another object of the invention is to provide a system that is capable of inspecting a large lot of individual devices. In some cases the inspection may be undertaken in response to deliveries from several suppliers to assure that all of the parts are consistent and genuine. In other cases there may be a contractual requirement to screen each and every device in a lot.

Another object of the invention is a test fixture that provides for testing a large number of parts simultaneously.

Yet another object of the invention is to provide a fixture that has preconfigured power and oscillatory inputs for the parts of interest. Another object of the invention is to provide an automated apparatus that accomplishes the test of multiple parts or devices simultaneously.

Still another object of the present invention is to provide system that non-destructively inspects an integrated circuit or the internal die and wire bonding of an integrated circuit to screen for counterfeit parts.

Another object of the present invention is to provide a system for detecting counterfeit electrical and electronic devices that eliminates complex testing of multiple electronic components employed within electrical and electronic devices.

Another object of the present invention is to provide a mechanism for inspecting fully populated circuit boards to determine if the board is counterfeit when compared to a genuine standard.

Another object of the present invention is to provide a mechanism for inspecting a fully populated circuit board to determine if the board has any counterfeit parts.

Another object of the present invention is to inspect a fully populated circuit board and determine specifically what parts on the board are counterfeit and which parts are authentic.

Another object of the invention is to detect counterfeit components that may reside on a partially populated circuit board or during steps in a manufacturing process on a circuit board before the board is fully populated.

In the case of fully or partially populated circuit board another object of the invention is to undertake the counterfeit screening or inspection process without having to do anything, but apply power to the fully or populated circuit board.

Another object of the present invention is the apparatus to provide for testing of circuit boards by applying only power to the circuit board.

Another object of the invention is to provide a means for providing power and other signal inputs to further enhance the counterfeit detection.

Another object of the invention is to provide a free field active illumination means to further enhance the RF energy collected by the RF energy collection apparatus.

Another object of the invention is to provide an inspection apparatus that is capable of identifying if there are any counterfeit components in a wholly assembled product that contains multiple boards, components, integrated circuits.

Yet another object of the present invention is to provide a system for detecting counterfeit electrical and electronic devices that eliminates complex testing of entire functionality of an electrical or electronic component or device.

Another object of the present invention is the step of adding only power to an electronic component, fully populated circuit board, a series of connected circuit boards or a fully assembled product for the detection of counterfeit electronics with the item being inspected or screened for counterfeit parts.

A further object of the present invention is to provide a method for detecting counterfeit electrical and electronic devices that includes the step of injecting one and only one signal into the electrical and electronic device under test.

Yet a further object of the present invention is to provide a method for detecting counterfeit electrical and electronic devices that includes the step of injecting only a combination of a power signal and a monotonic oscillating signal into the electrical and electronic device under test.

Yet another object of the invention is to provide a method for detection counterfeit electrical and electronic devices that includes the step of injecting a combination of a power signal monotonic oscillating signals and complex oscillating signals into the electrical and electronic device under test.

Another object of the invention is to provide a monotonic oscillating input that is swept across the specified input range of signal inputs on a device to include clock inputs, signal inputs and communications inputs where the monotonic oscillating input is directly injected into the item being inspected while simultaneously the RF energy collection means collects the energy emitted at each frequency change during the sweep and compares the collected energy to a predetermined signature that is anticipated of a genuine or authentic item being screened or inspected.

Another object of the invention is to provide a multitone oscillating input that is swept across the specified input range of signal inputs on a device to include clock inputs, signal inputs and communications inputs where the monotonic oscillating input is directly injected into the item being inspected while simultaneously the RF energy collection means collects the energy emitted at each frequency change during the sweep and compares the collected energy to a predetermined signature that is anticipated of a genuine or authentic item being screened or inspected.

Another object of the invention is to provide a method for identifying the match of the emitted signature at a given monotonic or multi-tonic step in the scanning across the desired frequency band where the collected energy at a give step is fully processed to provide a scalar output indicative of a counterfeit or genuine part and then the entire sequence of each scalar outputs across the entire band that is scanned over is weighed to provide an overall score that determines if the item being inspected is a counterfeit or a genuine part.

BRIEF DESCRIPTION OF THE VARIOUS EMBODIMENTS OF THE INVENTION

Figure 1:
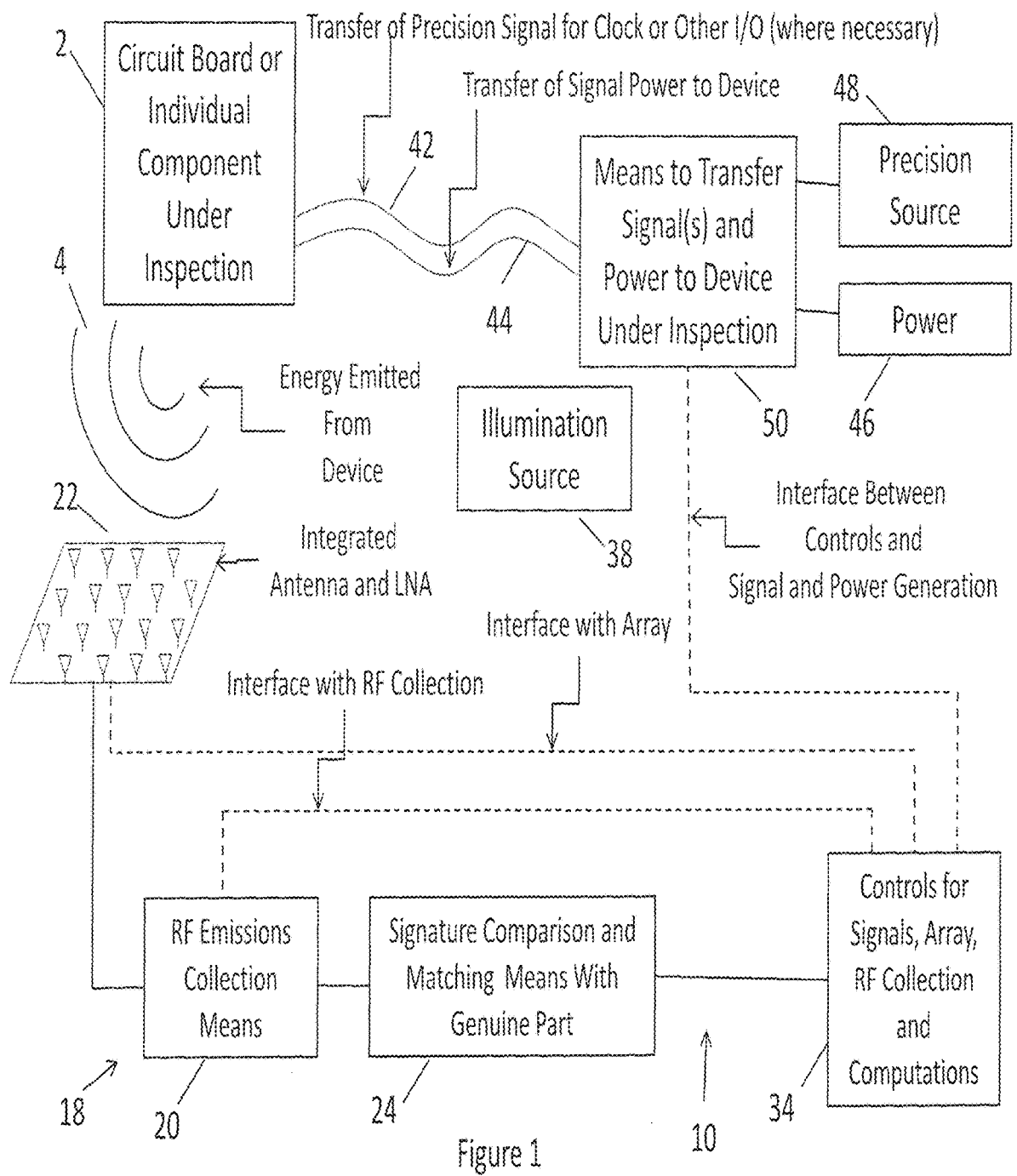
FIG. 1 is a schematic block diagram of a system for inspecting or screening electrical or electronic devices.

Prior to proceeding to the more detailed description of the present invention it should be noted that, for the sake of clarity and understanding, identical components which have identical functions have been identified with identical reference numerals throughout the several views illustrated in the drawing figures.

It is to be understood that a counterfeit electronic part is one whose identity has been deliberately or unintentionally misrepresented by at least one actor in the supply chain. This includes work-alike parts, used parts which have been removed from existing assemblies and sold as new, and genuine parts which have been remarked to misrepresent their model/part number, manufacturer, cage code, date and/or lot code, reliability level, inspection, level of testing, or performance specification. This definition also includes parts which do not conform to Original Component Manufacturer design, model, and/or performance standards, as well as parts which have been modified for malicious purpose with the intent to deceive as to the intended function.

These counterfeit part definitions extend to all parts to include, but not limited to active and passive circuit board parts, semiconductor devices and integrated circuits. Identical definitions apply to a counterfeit device, board, circuit board, circuit board assembly, assemblies, subsystems, systems or products.

Figure 2:
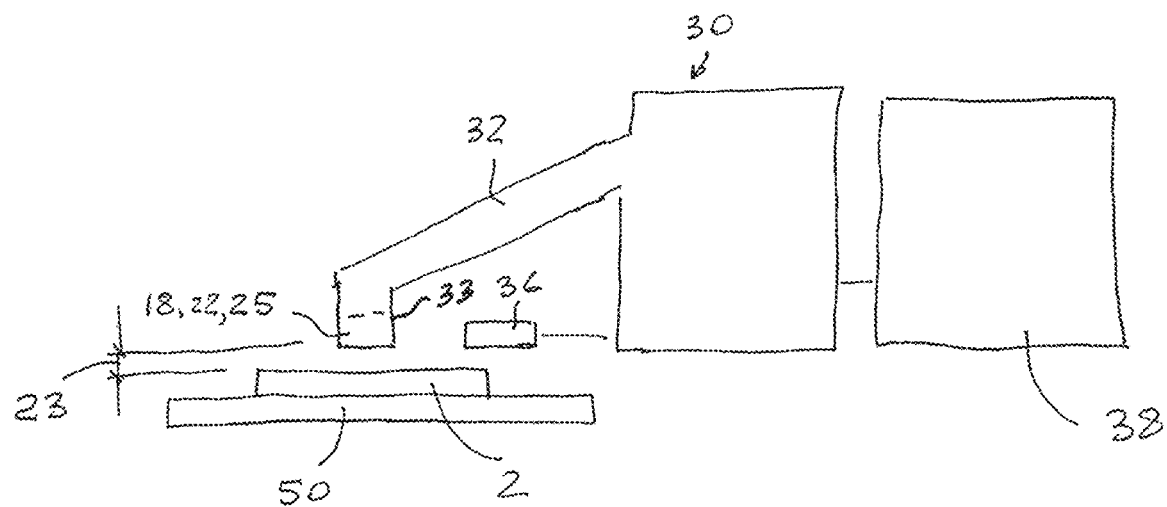
FIG. 2 is a schematic block diagram of the system of FIG. 1, particularly illustrating the precision signal input and a test apparatus.
Figure 3:
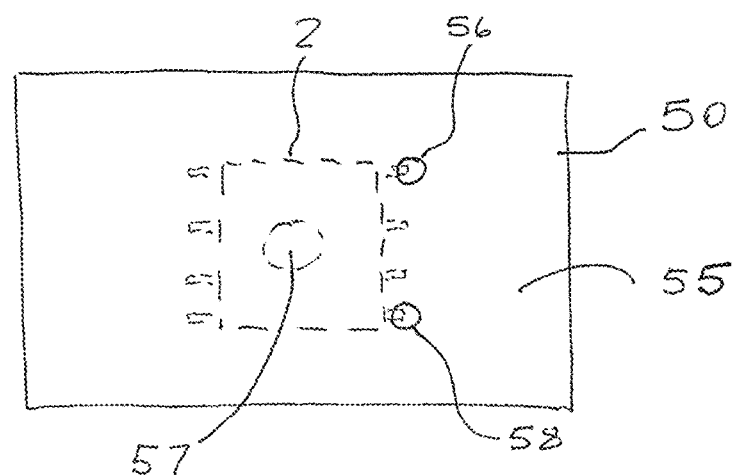
FIG. 3 is a planar view a test fixture employed within system of FIG. 1.

Now in reference to FIGS. 1-3, therein is illustrated a system, generally designated as 10, for differentiating between a counterfeit and genuine condition of an electrically powered device 2. The device 2 includes but is not limited to at least one of a discrete component, integrated circuit (IC), circuit board, circuit board assembly populated with electronic components, subsystem, system, electronic device and electrical device using electronic components for operation. All of these devices, under power, emit energy, either intended or unintended.

The forgoing description will be focused on emission of electromagnetic energy and, more particularly, the emission of electromagnetic energy being in a Radio Frequency (RF) spectrum, which is typically referred to in the art as frequencies below 300 GHZ, although infrared and infrasonic emissions are also contemplated by the instant invention.

The instant invention is illustrated and described in combination with an integrated circuit (IC) or a semiconductor, although it will be apparent to those skilled in the relevant art that the instant invention may be applied to other electrical or electronic devices and as such should not be interpreted as a limiting factor of the instant invention.

The described invention takes advantage of the fact that all electrical components, when powered, give off electromagnetic emissions. The emissions are defined by the radiating structures that are doing the emissions. There must be a source of energy that energizes the electronic component, board, system or subsystem to be tested. The mechanism of energizing can be simply powering the device, inputting an oscillating signal into the device or illuminating the device with electromagnetic energy. The directly injected or connected oscillating input and illumination source can be a single tone, multiple tones or multiple frequencies or complex with modulation and or timing parameters applied.

The energized item that is being inspected directly or indirectly must provide a mechanism for transmission of the energy that is being radiated which is governed by the internal design of the item being inspected. Typically, the source that powers the device is the energy which powers the electronics though as noted it can be an oscillating signal such as a clock, clock signal, signal, frequency input, frequency reference, signal generator, frequency generator or other oscillating sources that are known in the art. The mechanism that transfers the energy to a radiating element within the item being tested are integrated circuit dies, wire bonds, semiconductor traces, board traces, wires, cables or structural capacitive or inductive coupling. The radiating element may be an intentionally radiating antenna or an unintended antenna that due to physical dimensions acts as a reasonable antenna. If the internal parts of the electronics whether it be a discrete semiconductor, integrated circuit, printed circuit board, circuit board assembly or product are functioning differently the part will give off a different electromagnetic signature and counterfeit parts can be differentiated from genuine parts for inspection or screening purposes.

The system 10 includes means, generally designated as 18 for determining such condition of the electrically powered device 2, the condition defined by an emission characteristics (or signature) of RF energy 4 from the device 2 under test or inspection.

One essential element of the means 18 is a first means or emissions detection apparatus, generally designated as 20, which, in accordance with a presently preferred embodiment, is provided for at least one of sensing, processing, and algorithmically matching at least one emission of the RF energy for at least one of inspecting and screening the electronic device.

The detail description and operation of the first means 20 are best shown and described in the U.S. Pat. No. 7,515,094 and in U.S. Pat. No. 8,063,813, both issued to Keller, III; in the U.S. patent application Ser. No. 12/551,635 filed on Sep. 1, 2009 and entitled "ADVANCE MANUFACTURING MONITORING AND DIAGNOSTIC TOOL"; and in the U.S. patent application Ser. No. 13/344,717 filed on Jan. 6, 2012 and entitled "System and Method for Physically Detecting, Identifying, Diagnosing And Geo-locating Devices Connectable To A Network", all owned by the assignee of the instant invention and whose teachings are incorporated herein by reference thereto.

In the instant invention, the first means 20 includes RF collection means coupled to an antenna 22. It would be understood that the RF collection means 20 includes a receiver that can be general receiver or tuner and the general receiver can be a heterodyne or super-heterodyne receiver.

Many receiver embodiments are contemplated as a component to the RF energy collection apparatus to include as noted heterodyne or superhetrodyne receivers, wideband crystal video receivers, tuned Radio frequency crystal video receivers, narrowband scanning superhetrodyne receivers, channelized receivers, microscan receivers, Acousto-optic receivers and the vast array of tuner technologies that may often be referred to as synonymous with receivers.

In another embodiment the highly sensitive RF energy collection apparatus is a cryogenically cooled receiver.

The receiver can be improved by providing a broadband response. Though one embodiment focuses on emissions from 100 KHz to 6 GHZ the bandwidth can be reduced to 30 MHz to 1 GHz to capture the majority of emissions from the devices coming in to the facility.

Further sensitivity is achieved by lowering the noise figure of the system. In one embodiment the receiver has a modified front end with a Low Noise Amplifier (LNA) with an ultra-low noise figure.

In one embodiment the system has a noise figure of less than 5. In another embodiment the system has a noise figure of less than 1. In another embodiment the system has a noise figure less than 1.

From the receiver, the signature data will be sent to a processor. One embodiment is direct analog analysis. Though direct analog analysis is a described embodiment, the presently preferred manifestation is to use an analog to digital conversion (not shown) to convert the analog output of the receiver to digital output. The digital output is then sent to a signal processing apparatus.

One embodiment uses direct analysis of the analog signal into a digital output.

Another embodiment where higher frequencies are required, utilizes a down conversion of the analog output prior to conversion to a digital signal.

In one embodiment, the highly sensitive receiver further uses Digital Signal Processing (DSP) to further enhance the sensitivity of the receiver.

In another embodiment, the RF energy collection apparatus utilizes DSP filtering techniques to prepare the collected data for further processing by DSP algorithms.

One embodiment directed to improve sensitivity of the receiver uses a Fast Fourier Transform (FFT).

In another embodiment, the FFT is utilized in excess of 1 Million points.

In another embodiment, the FFT is implemented on an embedded chip within the RF collection apparatus.

Preferably, such antenna 22 is an antenna array positioned a predetermined distance 23 above the device 2. When the device 2 is a small discrete component or an integrated circuit, the antenna array 22 is positioned stationary relative to the device 2 under test. The elements of the antenna array 22 are weighted via electronic steering to optimize the energy collected from certain parts of the circuit board or larger item under test. In the case of a single component that is being tested no weighting is necessary or it could be weighted to enhance signature amplitude from the location of the component. In this embodiment the antenna array 22 provides constructive interference of the antenna pattern of each antenna in the array when the element is weighted to constructively enhance the gain on different areas of the board of interest to inspect individual parts on a board without the need for mechanical or robotic steering. When the device 2 is of a larger size, for example such as a printed circuit board assembly populated with electronic components, a single antenna element or much smaller number of elements integrated to the end of the robotic arm 32 are or a compact version of the antenna array 22 is positioned for movement, by way of an electronically controlled mechanical or robotic steering, over the surface of such printed circuit board or the printed circuit board is mounted for movement beneath the antenna array 22.

The antenna array 22 also includes an integrated Low Noise Amplifier (LNA) 25 into the antenna array 22. The advantage of integrating LNA 25 is in enhanced sensitivity of the entire system and enhanced level of the signatures given off by the device 2. The antenna 22 and LNA 25 may be mounted within an integrated circuit (IC) to perform electronically steered detection of counterfeits.

To further enhance the emission signatures, a low noise amplifier 25 with a noise figure of less than one can be employed to better approach the theoretical room temperature sensitivity of the system 10.

In another embodiment, a compact antenna array 22 with integrated LNAs 25 or a single compact antenna that is approximately the size of the components one wishes to inspect on a board with a single element may be integrated onto a robotic arm 32 for inspection of electronic items.

In another embodiment the antenna/LNA array tips suitable for a robotic arm 32 may be interchangeable based on the performance parameters sought for the inspection of certain electronic devices or components.

The instant invention also contemplates that the antenna array 22 and the emissions detection apparatus 20 may be mounted on a semiconducting substrate or die, such as silicone material, and attached to the tip 33 of the robotic arm 32. A More detailed description of this embodiment is provided in the co-pending U.S. Ser. No. 13/410,909 entitled "INTEGRATED CIRCUIT WITH ELECTROMAGNETIC ENERGY ANOMALY DETECTION AND PROCESSING", now issued as U.S. Pat. No. 9,059,189 B2 on Jun. 16, 2015, incorporated by reference herewithin.

The predetermined distance 23 essentially depends on the desired success rate of detecting counterfeit devices, the type of devices being inspected or screened and the sensitivity of the antenna array 22 and the RF collection means 20.

For the case of detecting electronics outright or identifying electronic devices at range most of the radiative energy components are attenuated to a level that makes them extremely challenging to detect. When the goal is to screen or inspect for counterfeit electronics, the detection apparatus can be placed at extremely close range to the components, boards or systems being tested. This invention focuses on that environment and the advantages of the extra information provided about the electronics being screened or inspected when in the near environment of the RF collection means. Accordingly, it is presently preferred to position the end of the antenna array 22 between about one micrometer and about one centimeter from the surface of the device 2. Preferably, the sensitivity of the RF collection means 22 is better than about −152 dBm.

Furthermore, the instant invention contemplate use of an active illumination source 38 configured to illuminate the device 2 that is at least one of detected, inspected or screened with free field RF energy to further enhance the emissions signature of the device 2 under test.

When antenna array 22 is mounted for stationary electronic steering of the beams of the array or for movement relative to the device 2 under test, the means 18 provides an automated mechanism 30 for collecting the RF energy from the device 2. By way of one example only of FIG. 2, such automated mechanism 30 includes a robotic arm 32 and a general controller 34 configured to control movement of the robotic arm 32. The automated mechanism 30 may further include a sensor 36 for setting such predetermined distance 23, particularly, when components within the device for example such as a printed circuit board assembly, have variable heights.

It is to be understood that such automated mechanism 30 for control of the robotic arm 32 used to position the means for collecting the RF energy may be provided as a stand alone system or may be incorporated into a manufacturing line (not shown) for printed circuit board assembly or any apparatus that allows for at least one of input, output and power connections.

It is to be further understood that although the positioning of the antenna array 22 or a single element antenna above the device 2 under test is depict to be in the vertical direction other orientations and manipulations can be undertaken by the robotic arm to access difficult to reach spaces in fully assembled products or complex assemblies. In another embodiment, different orientation of the antenna array 22 may be utilized based on an assessment that the device 2 being inspected tends to radiate the RF energy being collected from that direction. It follows, based on the conventional wisdom in the art, other special orientations are also contemplated by the instant invention for a number of other test specific orientations.

Unlike conventional full electrical tests, the instant invention is based on activating limited or baseline functionality of the device 2 in order to screen for and inspect for counterfeits. In the case of circuit board, printed circuit board assembly or partially or fully assembled products, typically is sufficient to provide power to the board. All of the inputs and outputs are not necessary, though clearly those skilled in the art would be aware that connecting all of the inputs and outputs might potentially serve to improve the statistical screening success of the instant invention. The board in this state will undertake it's basic functions and the RF emissions collection means 20 is able to collect enough differentiable information to screen for counterfeits and tell of the board itself is genuine or a counterfeit and if a specific component on the board is a counterfeit.

In the case of components/device 2 that are intended to be integrated into a circuit board prior to the board existing manufacturing line, one embodiment is directed to simply providing power input 42 to the component/device 2 so as to only electrically turn the component or board ON. Another embodiment is directed to only providing an oscillatory input 44, preferably to energize the clock in input or output of the device 2 under test. In the presently preferred embodiment of the invention, the power signal 42 is combined with the oscillatory input 44. Such oscillatory input 44 is preferably monotonic oscillating signal, but can be also provided as a multi-tone input or a modulating or modulated oscillating signal. The use of multi-tone input injection aids in developing cross-modulated and intermodulated responses that translate into unique signatures for a counterfeit versus a genuine devices. Furthermore, use of multi-tone injection aids in developing non-linear responses that translate into unique signatures for counterfeit versus genuine devices.

The method of energizing of the device with a power signal 42 and oscillator signal 44 applies to semiconductor devices, integrated circuits, board level devices such as surface mount or through whole parts, sub-boards or daughter boards, entire circuits boards, assemblies of multiple boards or even whole products. Of importance in the presently preferred embodiment of the invention is to provide power signal 42 to power the device 2 as a baseline and a single simple monotonic oscillatory signal 44 energize basic device functions that will then, when active, create electromagnetic emissions for capture by the RF collection means 20 and antenna array 22 or individual antenna positioned in the near vicinity to the device 2 and analyzed against an expected standard or baseline characteristics of a genuine part.

In an example of the device 2 being the IC part, the power input 42 will turn the IC ON and the oscillating signal 44 will enable internal circuitry by providing an oscillatory input into pin or port on an IC specification sheet that is often referred to as a clock input or Clock In, but would not cause more complex operation of the IC, since no other inputs are being energized. Another example would be providing the oscillatory input only signal, communications or secondary clock inputs with the primary focus on energizing the underlying circuitry of the IC.

Accordingly, the system 10 provides a power input source 46 and an oscillator input source 48. The oscillator input source 48 may be termed as crystal oscillator, ceramic oscillator, oscillator, time standard, signal, signal generator, frequency reference or other similar terms in that are typical in the art. Although each of these sources may have differences when analyzed in detail, each of them fundamentally provides a mechanism to provide an oscillatory input to the device 2.

It has been found that the manner in which the semiconductor responds is dependent on the quality of the oscillator input 44 that is used to drive either the clock inputs or the signal inputs of the semiconductor device 2.

Satisfactory results have been achieved by using temperature compensated Crystal Oscillator (TCXO), microcomputer compensated Crystal Oscillators (MXCO), Oven Controlled Crystal Oscillator (OCXO), small atomic frequency standards (Rubidium (Rb) and Rubidium oscillators (RbXO)), and high performance atomic standards such as Cs all provide accuracy in excess of $10^{-4}$. In the presently preferred embodiment the precision of the oscillating signal 44 exceeds $10^{-8}$, and the source 48 is a small atomic frequency standard oscillator. Thus, the oscillator signal source 48 is hereafter referred to as a "high precision signal source" and the oscillator signal 44 is hereafter referred to as "high precision oscillator signal". The high precision signal further has a frequency thereof being consistent with input requirements of the device 2.

The oscillator source 48 described above needs only be used to energize the device 2. Though more spectrally rich emissions can be derived by adding modulations or complex timings to the manner in which the device is driven, the presently preferred embodiment limits complexity to only energizing the device input such as the clock or other signal input and creating an emissions pattern that provides information as to whether the condition of the device 2 is genuine or counterfeit.

Another embodiment provides a second mechanism for allowing the oscillator source 48 to sweep over a frequency band while providing a means to measure the emissions od the device 2 simultaneously. One embodiment has the frequency sweep occurring continuously. Another embodiment uses a discretized sweep where only certain predetermined discrete frequencies over the band of interest are swept. The frequency swept over will depend on the anticipated inputs of the device 2 under test. In some cases it may suffice to sweep over several Hz, others KHz of bandwidth, others MHz of bandwidth and others GHz of bandwidth. The instant invention is capable of covering any of these ranges, but for cost concerns the bandwidth is typically limited to ranges that are effective, but not exhaustive. It is clearly contemplated that any of these bandwidth intervals could be used and are anticipated by the invention.

In addition, the instant invention contemplates energizing of inputs outside of the range specific of the device being driven. In this case, the genuine part may have been developed to have a wider input range than actually specified to provide a more robust part whereas the counterfeit part may not have that capability. In either case, responses such as non-linear responses that differ between the parts are readily translated to an adequately configured RF collection means 20.

Further complemented by this invention is the altering of the amplitude of oscillator input to device inputs such as clock inputs, signal inputs and other inputs that may have been defined by the manufacturer of the device 2.

In another embodiment, the amplitude is not only altered, but amplitude modulation is applied.

In addition to energizing inputs, the instant invention contemplates energizing output(s). Driving the outputs also creates device architecture responses. For instance, a genuine part might have filtering or Electrostatic Discharge (ESD) protection in the device that a counterfeit part does not have. The counterfeit part may "light up like a Christmas tree" in the RF spectrum when some standard protection is not included in the circuits by a counterfeiter who is trying to save costs.

When the device 2 is a printed circuit board, printed circuit board assembly or any larger device, the instant invention contemplates simply connecting power input 42 to the device without the need to drive any of the other inputs or outputs of the device. The invention also clearly contemplates the use of power input 42 and oscillator input 44 to respective inputs (or outputs) of such device 2. For smaller components, such as discrete semiconductors, integrated circuits and the like, the instant invention provides a test fixture 50 which provides means for transferring such input 42 and 44 to the device 2. For example, such test fixture 50 may be a zero insertion force socket configured to receive such device 2 and preconfigured to apply such input 42 and 44 thereto. In another example, the test fixture 50 may be any specialized apparatus that facilitates an effective manner or applying power to the power pin and an oscillating signal to other desired inputs (or outputs). Grounds are also typically connected as well. Or, as it can be seen in FIG. 3, the text fixture 50 may simply provide two surface level contacts 56, 58 and means for temporarily securing the device 2 positioned thereon. For example, such temporarily securing means may be a vacuum generating device 57 positioned below the surface 55 of the text fixture 50.

A second essential element of the means 18 is means 24 for comparing and matching the collected RF energy to a set of parameters identified for a baseline configuration of a genuine device 2. It would be understood that means 24 includes at least one processor, though it also contemplates other hardware or firmware manifestations of verifying a match with the anticipated parameters.

Means 24 includes at least one algorithm to match the data collected to the expected signature for the device 2. The presently preferred embodiment uses more than one automated algorithm. The presently preferred embodiment utilizes several algorithms that match mutually exclusive parameters of the RF energy emission signature. In this manner the ability to match the collected signature to the expected signature is improved. The weighting of these algorithms favorably improves the ability to detect poor quality parts to include counterfeit parts.

Thus, means 24 includes at least one of Harmonic Analysis, Matched Filter, non-harmonic correlation, timing correlation, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending algorithms.

In the clustering analysis, statistics are measured and generated on key electromagnetic emissions of the sampled components. A total of N statistics are measured on each of M components, in turn, to develop M sets of N statistics. Each statistic is then assigned a unique axis in N-dimensional space and the measured statistics for each of the M measured components are stored. A Hierarchical Agglomerative Clustering (HAC) algorithm is then applied to segregate clusters in the spatial distribution. The identified clusters represent component sets that differ in their performance parameters beyond the typical distribution in manufacturing. Any illegitimate components inserted into the sampled set are necessarily revealed as a separate cluster in the analysis.

The HAC algorithm operates iteratively, wherein successive iterations agglomerate (merge) the closest pair of clusters (or data points, on the first iteration by satisfying some similarity criteria. Typically, this similarity is defined by a measure of distance between clusters. However, many of the measured features, which represent the axis in N-dimensional space, are distinct and unrelated. The Mahalanobis Distance, a metric which corrects for dissimilar scales through an assessment of covariance, conceived for this exact, purpose and is used as the basis of similarity between clusters in this analysis. The Mahalanobis distance $d(\vec{x}, \vec{y})$ is defined between two vectors $\vec{x}$ and $\vec{y}$ as, $$d(\vec{x},\vec{y}) = \sqrt{(\vec{x}-\vec{y})^T S^{-1}(\vec{x}-\vec{y})},$$

where S is an estimate of the joint covariance between the two vectors. In the current application, each vector is represented by a position vector in N-space, and the joint covariance between two clusters is estimated from their constituent data points. Normalizing to the joint covariance matrix of the two clusters gives the Mahalanobis distance the essential property of scale-invariance.

Clusters are extended bodies in N-dimensional space, this requires that the distance metric endpoints be well-defined. While there are several "linkage" options available, such as the minimum data point distance between two clusters (termed single linkage) or the maximum point-wise distance (termed maximal linkage), the place to put the ruler endpoints is at the mean of each cluster in N-space. This linkage method allows the covariance of each cluster to be considered in the Mahalanobis distance metric. It also reduces the computation necessary, since cluster means can be updated in a running fashion without having to iterate over all the constituent data points.

The stopping criterion of the algorithm (i.e. the separation distance threshold which precludes further agglomeration) is determined through an assessment of the manufacturing tolerances observed during analysis. Clusters are developed and nested by similarity in multiple tiers and an analysis of these tiers provides insight into the existing variance.

Information loss, as the number of clusters increases is used to identify the optimal stopping criterion. The Symmetrized Kullback-Liebler Divergence (SKLD) is a prime measure of information loss. The SKLD is defined for two models P and Q as, $$D(P \| Q) = \sum_i P(i) \log \frac{P(i)}{Q(i)} + \sum_i Q(i) \log \frac{Q(i)}{P(i)}.$$

The SKLD provides a measurement the information difference between two models (i.e. two tiers of HAC). Plotting $D(P\|Q)$ for several tiers usually illustrates an inflection point. The optimal number of clusters is identified just below the inflection point.

Figure 4:
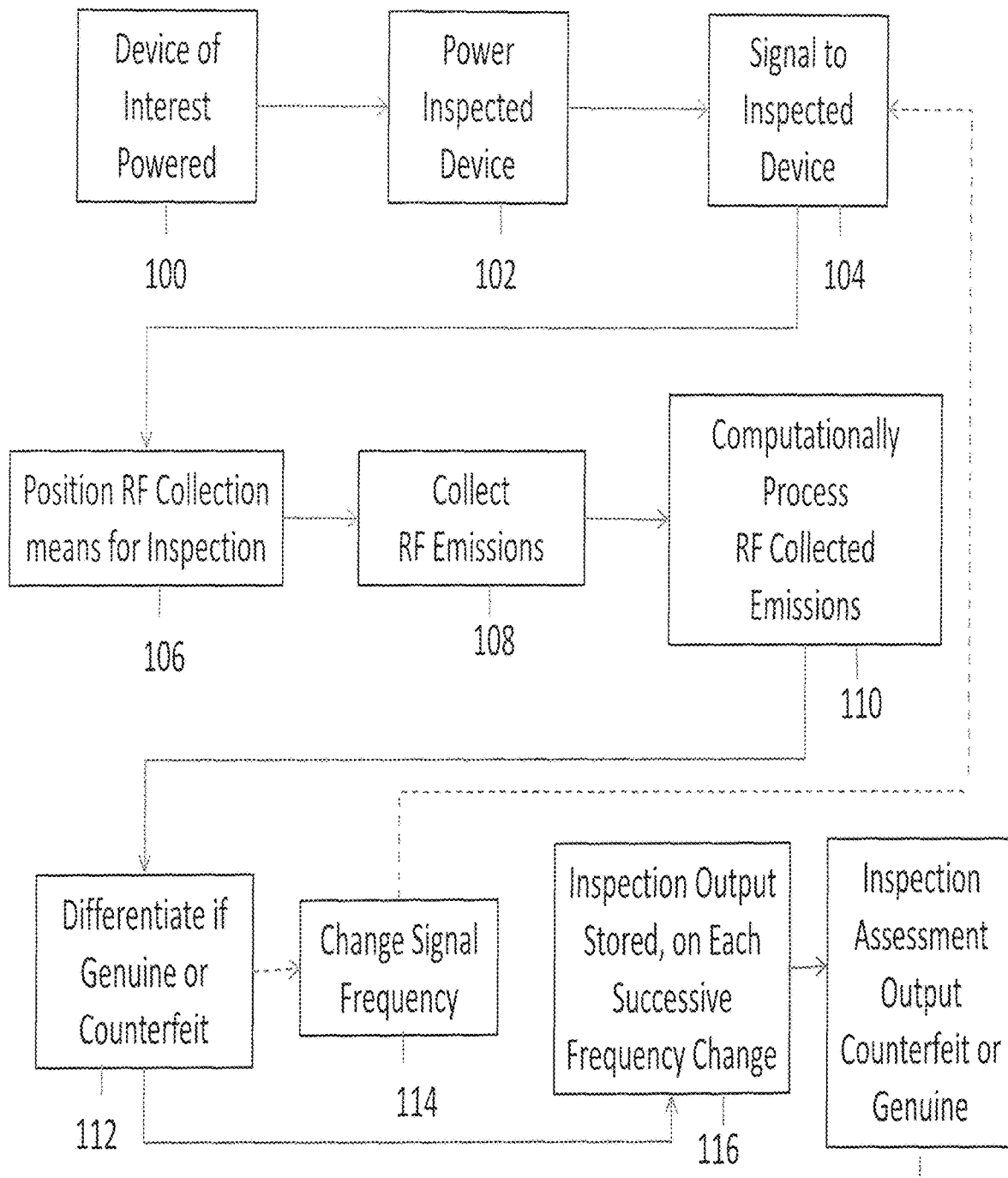
FIG. 4 is a flow chart of a method for inspecting or screening electrical or electronic devices.

Now in reference to FIG. 4, the presently preferred method of inspecting or screening for counterfeit electronic or electrical device starts with powering the device 2 at step 102 and inputting an oscillating signal at step 104. Then, the RF collection means 20 is positioned in step 106 and is operable to collect RF emissions from the device 2 injected with power signal 42 and oscillating signal 44. Collected RF emissions are computationally processed at step 110 which includes the step of comparing and matching signature of collected RF emissions 4 with RF emission signature characteristics for a genuine device 2 determine by various methods, for example sampling of plurality of devices 2, manufacturing specifications and the like methods.

It is contemplated to use various automated algorithms within the step 110. The step 110 may include the step of obtaining discrete wavelet transform coefficient statistics or the step of obtaining relative phase measurement and comparing obtained phase measurement to anticipated phase measurements. Step 110 may also include the step of using at least one of a clustering algorithm a Hierarchical Agglomerative Clustering (HAC) algorithm.

The Wavelet transform is a multi-resolution analysis technique employed to obtain the time-frequency representation of an analyzed emission. It is an alternate basis function to the Fourier Transform and is based on the expansion of the incoming signal in terms of a function, called mother wavelet, which is translated and dilated in time. From the computational point of view, the Discrete Wavelet Transform (DWT) analyzes the signal by decomposing it into its 'approximate' and 'detail' information, which is accomplished by using successive low-pass and high-pass filtering operations respectively.

The high-pass 'detail' coefficient outputs of these multiple decompositions as features in signal classification have been found advantageous for use in the instant invention. DWT has been found beneficial for classifying near-identical device emissions based on a measure of skewness obtained by applying the Wavelet Transform on frequency domain information. DWT analysis is applied on the frequency domain emission data of each emission within the intersection ∩E defined. Average energy at each of the different detail-coefficient scales is computed and each resulting value shall be retained for use in classification.

The phase information of identified emissions is used to provide a particularly sensitive assessment of circuit modification. Signal phase (and, in turn, emission phase) is easily modified through slight variations in either distributed or localized impedance within a given circuit. Phase information is therefore highly relevant when seeking identify subtle circuit changes.

Figure 6:
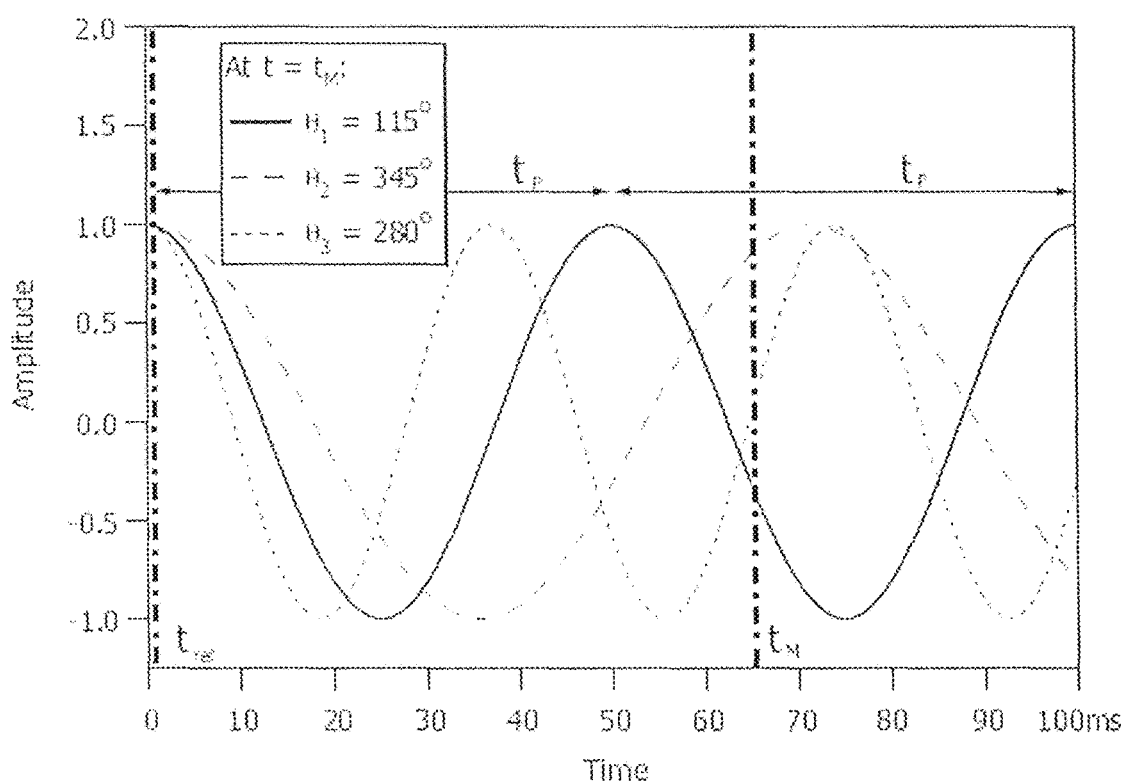
FIG. 6 is a diagram of harmonic emissions algorithm employed in the system of FIG. 1.

Now in reference to FIG. 6, in relative phase measurement algorithm, phase measurements are performed on each emission relative to another (or several other) emissions, due to the lack of a known reference. Any set of static frequency emissions are necessarily repetitive within a time-domain envelope and, therefore, contain a repetitive phase relation at a certain point within this envelope, which is named as the reference time $t_{ref}$. If a measurement of the signals is made at some other time, $t_M$, during the repetitive envelope, the phases at $t_M$ will not usually appear to correspond in any obvious way to those of $t_{ref}$ due to the time difference $t_{ref}-t_M$. The identification of $t_{ref}$ from a measurement made at $t_M$ allows a shift of the time reference back to $t_{ref}$ and, in turn, an alignment of the phases such that a single, repeatable measure of relative phase relation may be taken.

Nominally, harmonics are expected to have a relative phase measurement of 0°, while inter-modulation components are expected to have relative phase measurements of either 0° or 180°. Precise phase relationship of harmonics and inter-modulation components often varies from these nominal expectations and may be effectively used to characterize circuitry. The deviation in relative phase from the nominal value is attributed to the small changes in circuit reactance at the varying frequencies of the analyzed harmonics.

Some methods rely on frequency domain phase detrending, which generally has drawbacks in the computational ambiguities associated with the modulo 2pi calculations. Other methods rely on the use of a reference signal to establish a precise reference time off of which to measure.

Given these drawbacks, neither of these approaches is an optimal methodology for emission measurement. However, when the relationship is known a priori (that is, if the signals are harmonics—0° shifts—or inter-modulation components—0° or 180° shifts), one may minimize a function of the difference in phase on each signal from the expected values using a single time delay offset as the independent variable. This approach, taken inventors provides the framework to analyze the phases of harmonic and inter-modulation emission content for variations between measured ICs and other devices.

Each of the emission patterns identified as belonging to a harmonic or inter-modulation relationship is assessed to determine precise relative phase measures.

It has been found that ANN algorithm excels in learning trends occurring in large databases, combining information in manner optimized to either classify or function fit.

There are several desirable aspects to neural network-driven data analysis. The RF emission data contains a rich and diverse set of characteristic signatures for persistent monitoring and diagnosis. To achieve the most sensitive, accurate and reliable results, as much of this information as possible is included in the analysis. However, the fact that the phenomenology of RF emissions consists of a combination of broadband and narrowband characteristics makes it difficult to determine a robust RF processing technique appropriate to the task. ANN's are highly skilled at combining large or diverse information into easily understood quantities. Additionally, simply providing ANN's with useful data and instructions pertaining to the desired categorization obtains solutions to complex problems. This feature allows the use of multiple RF techniques in conjunction, utilizing all relevant information to ultimately distinguish one unique signature from another.

Next at step 112, the computationally processed RF emissions are discerned to determine condition of a genuine or counterfeit device 2. If required, the frequency setting of the oscillating signal may be changed in step 114 and steps 104 through 112 are repeated. Each measured response is stored at step 116 and the responses are compared with each other to improve counterfeit inspection. The frequency change may be associated with different frequency amplitude settings and/or different relative phases between two or more signals. When at least two inputs are injected with the oscillating input 44, the collected RF emission data for each input is compared individually against the expected signature and injection into all inputs simultaneously.

Finally, at step 118, assessment of the condition of the device 2 is made so as to discern between genuine and counterfeit device 2. The step 118 of determining the genuine device 2 includes the step of analyzing at least one of frequency locations of emissions components, phases of emissions, cross-modulation and inter-modulation components generated by the internal circuitry, shape of any individual emission, quality factors of any individual emissions or timing characteristics of emissions.

Figure 5:
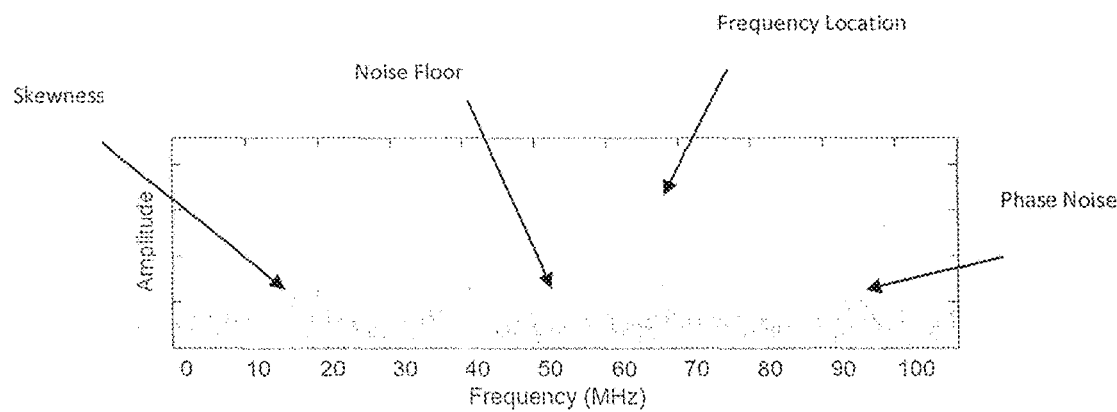
FIG. 5 is an exemplary diagram of collected frequency distribution.

The presently preferred method of inspecting or screening for counterfeit electronic or electrical device 2 further includes the step of establishing the baseline RF characteristics representative of the genuine device 2. Such step of establishing the baseline RF characteristics includes the step of large scale comparison of spectral emissions and the step of reducing the large scale comparison to narrowband comparisons and outputting after comparison and further reduction a single scalar value based on the quality of the comparison match. The step of establishing the baseline RF characteristics may also include the step of obtaining local spectral power density statistics, wherein plurality of semiconductors are sampled and discriminated based on localized statistical feature measured on each of emissions common between sampled devices. The statistical features include at least one of Emission Frequency Location, Emission Peak Magnitude, Emission Phase Noise, Emission Symmetry, Skewness, and Emission Local Noise Floor, as best shown in FIG. 5.

This invention provides the necessary steps and specifics to simultaneously applying power and one or more than one oscillatory input and simultaneously measuring the RF emitted by the device 2 under these conditions whether that emission 4 be conducted or radiated to detect, screen, identify and inspect for counterfeit electronics.

The instant invention also uses the intended or unintended RF emissions 4 characterize devices at the die or substrate level. The introduction of free field EM field strengths at select frequencies where the device is measured to be emitting, will amplify and/or alter the unintentional radiation characteristics of the device. This invention further contemplates an embodiment wherein an active illuminating source is used to enhance the emissions collected by the RF collection means. In this case the power to the device being applied is applied via the test fixture and the RF collection means collects the emitted energy. During this collection the free-field illumination source is turned on to energize the circuit. Another embodiment encompasses the application of power and the oscillating signal via physical connection to the device being tested while the free field illumination is carried out and the RF collection apparatus collects the emitted energy. In this embodiment the illumination source may illuminate using single frequency monotonic, multi-tone or complex modulated RF energy.

The introduction of EM field strengths via the illumination source at select frequencies may amplify and/or alter the unintentional radiation characteristics of the device. One advantage of the instant invention includes amplification of the RF emission signature to improve the ability to detect, inspect or screen counterfeit electronics.

The field strengths necessary to cause the described responses may not have to be so robust. Lower field strengths in some cases may enhance the emissions collected substantially. For example, oscillator instabilities at low field strengths can significantly alter the emission signature of such devices.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. A counterfeit detection system, comprising:
    an input signal generation source configured to inject, through a test fixture, a preselected signal into an electrical device disposed in the text fixture;
    an antenna positioned, during use, above the electrical device;
    a receiver coupled to said antenna and configured to collect electromagnetic energy in a radio frequency (RF) spectrum emitted from the electrical device in a response to said preselected input signal being injected thereinto; and
    a processor configured to determine one of a genuine and a counterfeit condition of the electrical device based on a comparison of an emission signature characteristics of said collected electromagnetic energy in said RF spectrum against baseline emission signature characteristics.

2. A counterfeit detection system, comprising:
a test fixture, said test fixture configured to receive an electrical device therewithin;
an antenna;
a receiver coupled to said antenna and configured to collect electromagnetic energy in a radio frequency (RF) spectrum emitted from the electrical device in a response to an input being injected thereinto through said test fixture; and
a processor configured to determine one of a genuine and a counterfeit condition of the electrical device based on a comparison of an emission signature characteristics of said collected electromagnetic energy in the RF spectrum against baseline emission signature characteristics.

3. The counterfeit detection system of claim 2, wherein the electrical device is at least one of a semiconductor and an integrated circuit, and wherein said test fixture comprises a zero insertion force socket.

4. The counterfeit detection system of claim 3, wherein said input is at least one of a power input and an oscillatory input and wherein said zero insertion force socket is preconfigured with said at least one of said power and said oscillatory input.

5. The counterfeit detection system of claim 2, further comprising an input generation source configured to inject said input as an oscillatory signal, into the electrical device through said test fixture.

6. The counterfeit detection system of claim 5, wherein said input generation source generates said oscillatory signal with a precision that exceeds $10^{-8}$.

7. The counterfeit detection system of claim 5, wherein said input generation source comprises a high precision signal source configured to generate a high precision oscillatory signal for driving at least one of a signal input and a clock input of the electrical device, said high precision signal source is being selected from a group consisting of a temperature compensated Crystal Oscillator (TCXO), a microcomputer compensated Crystal Oscillator (MXCO), an Oven Controlled Crystal Oscillator (OCXO), a small atomic frequency standard oscillator and a Rubidium oscillator (RbXO).

8. The counterfeit detection system of claim 2, wherein said antenna is positioned, during use, above the electrical device.

9. The counterfeit detection system of claim 8, further a comprising a robotic arm and wherein said antenna is integrated into an end of said robotic arm, said antenna being positioned, during use, above the electrical device.

10. The counterfeit detection system of claim 2, wherein said antenna comprises an antenna array positioned at a distance above the electrical device.

11. The counterfeit detection system of claim 10, wherein the electrical device and said antenna array are mounted for a movement relative to one another.

12. The counterfeit detection system of claim 10, wherein said antenna array comprises an integrated Low Noise Amplifier.

13. The counterfeit detection system of claim 10, wherein said antenna array comprises an electronically steered antenna array.

14. The counterfeit detection system of claim 10, wherein said distance is between about one micrometer and about one centimeter.

15. The counterfeit detection system of claim 2, wherein said processor executes at least one of a Harmonic Analysis, a Matched Filter, an Artificial Neural Networks (ANN), a specifically multilayer perception (MLP) feed-forward ANN with back propagation (BP), a Wavelet Decomposition, an Autocorrelation, Spectral Feature Measurements or Statistics, a Clustering and a Phase Detrending.

16. The counterfeit detection system of claim 2, wherein said processor executes at least one of a Discrete Fourier Transform, a Fast Fourier Transform, a Discrete Cosine Transform, a Laplace Transform, a Z Transform, a Star Transform, a Short-Time Fourier Transform, a Cepstrum, an Infinite Impulse Response Filter, a Finite Impulse Response Filter, a Cascaded integrator-comb filter, an Elliptical Filter, a Chebyshev Filter, a Butterworth Filter, and a Bessel Filter.

17. A method for at least one of inspecting and screening at least one of an integrated circuit and a device employing said integrated circuit in order to determine one of a counterfeit condition and a genuine condition thereof, said method comprising the steps of:
(a) positioning an antenna in a close proximity to said integrated circuit;
(b) injecting a first signal into said integrated circuit;
(c) collecting, with said antenna and a receiver coupled to said antenna, a first emission of electromagnetic energy in a radio frequency (RF) spectrum, said first emission radiated by said integrated circuit in response to said first signal injected in step (b);
(d) injecting, with said signal generation source, a second signal into said integrated circuit;
(e) collecting, with said antenna and said receiver, a second emission of electromagnetic energy in said radio frequency (RF) spectrum, said second emission radiated by said integrated circuit in a response to said second signal injected in step (d);
(f) simultaneously generating, with a processor, representative signature characteristics of said first and second emissions;
(g) determining, with said processor, a first deviation between said first emission signature characteristics and baseline RF emission signature characteristics for said integrated circuit;
(h) determining, with said processor, a second deviation between said second emission signature and said baseline RF emission signature characteristics for said integrated circuit; and
(i) detecting, with said processor based on said first and second deviations, said one of said counterfeit condition and said genuine condition.

18. The method of claim 17, wherein one of the steps (b) and (d) comprises the step of injecting a power input signal.

19. The method of claim 17, wherein one of the steps (b) and (d) comprises the step of injecting an oscillatory clock signal.

20. The method of claim 19, the step of injecting an oscillatory clock signal comprises the step of injecting said oscillatory clock signal with a high precision signal frequency oscillation generation source.

21. A counterfeit detection system, comprising:
a test fixture comprising a zero insertion force socket, said zero insertion force socket configured to receive one of a semiconductor and an integrated circuit therewithin;

an antenna;

a receiver coupled to said antenna and configured to collect electromagnetic energy in a radio frequency (RF) spectrum emitted from the one of the semiconductor and the integrated circuit in a response to an input being injected thereinto through said test fixture, said input being at least one of a power input and an oscillatory input; and a processor configured to determine one of a genuine and a counterfeit condition of the one of the semiconductor and the integrated circuit based on a comparison of an emission signature characteristics of said collected electromagnetic energy in the RF spectrum against baseline emission signature characteristics;

said zero insertion force socket being preconfigured with said at least one of said power input and said oscillatory input.

22. A counterfeit detection system, comprising:

a test fixture, said test fixture configured to receive an electrical device therewithin;

a robotic arm;

an antenna, said antenna integrated into an end of said robotic arm, said antenna being positioned, during use, above the electrical device;

a receiver coupled to said antenna and configured to collect electromagnetic energy in a radio frequency (RF) spectrum emitted from the electrical device in a response to an input being injected thereinto through said test fixture; and a processor configured to determine one of a genuine and a counterfeit condition of the electrical device based on a comparison of an emission signature characteristics of said collected electromagnetic energy in the RF spectrum against baseline emission signature characteristics.

23. A counterfeit detection system, comprising:

a test fixture, said test fixture configured to receive an electrical device therewithin;

an antenna comprising an antenna array positioned at a distance above the electrical device;

a receiver coupled to said antenna and configured to collect electromagnetic energy in a radio frequency (RF) spectrum emitted from the electrical device in a response to an input being injected thereinto through said test fixture; and a processor configured to determine one of a genuine and a counterfeit condition of the electrical device based on a comparison of an emission signature characteristics of said collected electromagnetic energy in the RF spectrum against baseline emission signature characteristics;

the electrical device and said antenna array being mounted for a movement relative to one another.

24. A counterfeit detection system, comprising:

a test fixture, said test fixture configured to receive an electrical device therewithin;

an antenna comprising an antenna array positioned at a distance above the electrical device, said antenna array comprising an electronically steered antenna array;

a receiver coupled to said antenna and configured to collect electromagnetic energy in a radio frequency (RF) spectrum emitted from the electrical device in a response to an input being injected thereinto through said test fixture; and a processor configured to determine one of a genuine and a counterfeit condition of the electrical device based on a comparison of an emission signature characteristics of said collected electromagnetic energy in the RF spectrum against baseline emission signature characteristics.

* * * * *